Jan. 18, 1938.  R. K. LEE  2,105,743
PISTON, AND PISTON AND CONNECTING ROD ASSEMBLY
Filed May 19, 1934
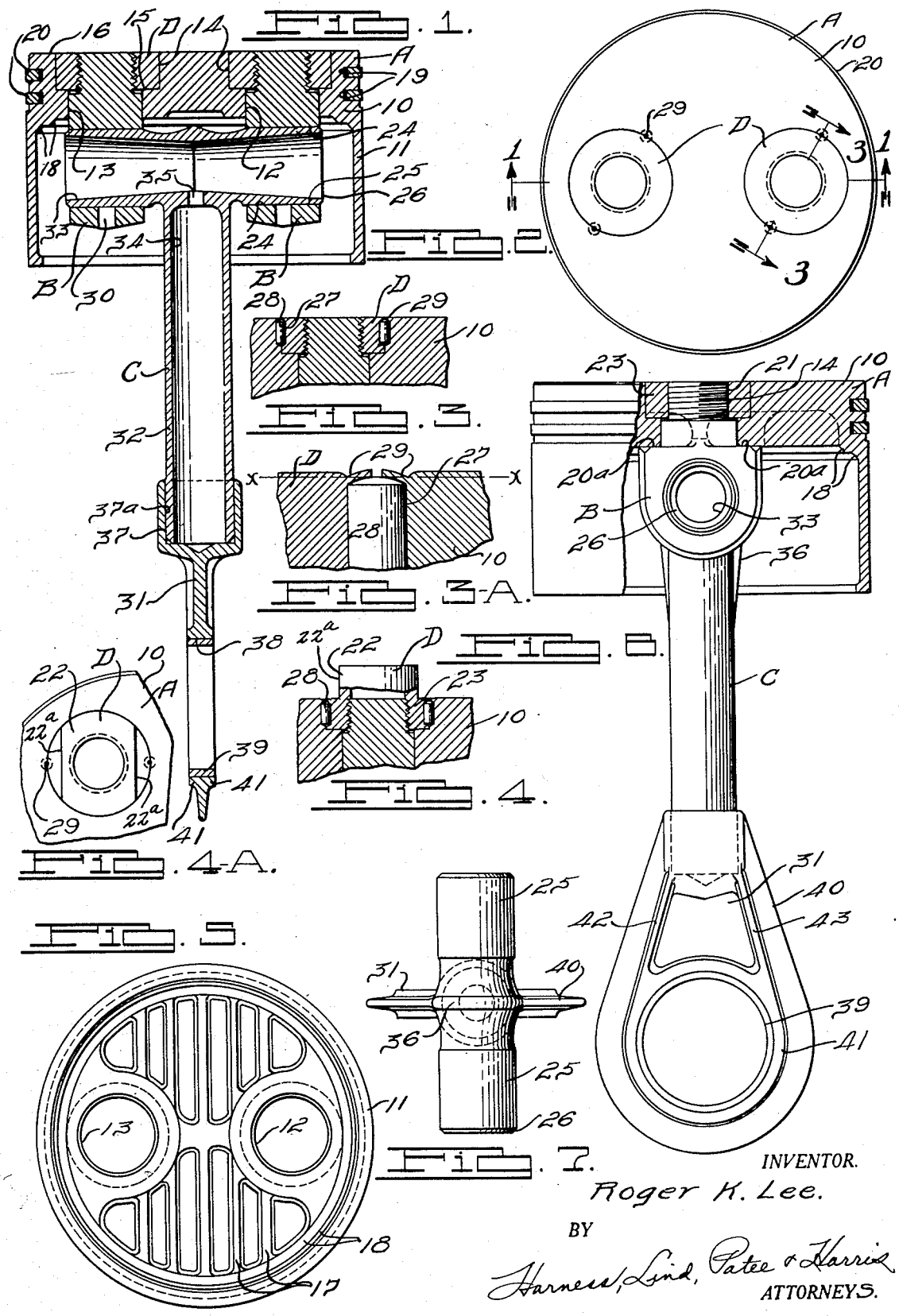
INVENTOR.
Roger K. Lee.
BY
Harness, Lind, Patee & Harris
ATTORNEYS.

Patented Jan. 18, 1938

2,105,743

UNITED STATES PATENT OFFICE 2,105,743

PISTON, AND PISTON AND CONNECTING ROD ASSEMBLY

Roger K. Lee, Highland Park, Mich., assignor to Chrysler Corporation, Detroit, Mich., a corporation of Delaware Application May 19, 1934, Serial No. 726,487

2 Claims. (Cl. 309—16)

This invention relates to internal combustion engines and refers more particularly to improvements in pistons, and piston and connecting rod assemblies.

This application is directed to improvements in the subject matter set forth in my co-pending application Serial No. 726,486, filed May 19, 1934, the latter being a division of my co-pending application Serial No. 657,146, filed February 16, 1933.

One object of my invention is to provide a piston, and piston and connecting rod assembly of improved characteristics whereby the engine may be successfully operated at speeds materially higher than the usual speeds of conventional engines used for driving motor vehicles, for example. While my improved piston, and piston and connecting rod assembly are not necessarily limited in their application to such high speed engines, my improvements are particularly adapted to such applications.

A further object of my invention is to provide an improved piston structure of unusually light weight, at the same time affording the strength requisite for high speed operation.

A further object of my invention is to provide an improved method of assembly for the component piston parts and for the piston and connecting rod.

Another object of my invention is to provide an improved piston construction which, under the temperatures and other operating conditions, will not produce local stresses and distortions heretofore giving rise to oil pumping and leakage, relief of oil cushion, piston slap, piston wear, and other objectionable commonly experienced characteristics. I preferably provide a cylindrical piston skirt free from boss openings, slots, perforations and the like which have heretofore largely contributed to the aforesaid objectionable characteristics.

In order to realize the improvements afforded by my piston, I have further provided improved means for attaching the piston head, the bosses and head being preferably formed of the same material or materials having the same coefficients of expansion whereby the piston parts will not relatively separate. Such separation in pistons subjected to unusually high speed operations would quickly give rise to piston failures.

Further objects and advantages of my invention will be more apparent from the following detailed description of one illustrative embodiment thereof, reference being had to the accompanying drawing, in which:

Fig. 1 is a sectional elevational view of my piston and connecting rod assembled as an operating unit, the section being taken along the line 1—1 of Fig. 2.

Fig. 2 is a top plan view of the piston shown in Fig. 1.

Fig. 3 is a fragmentary sectional elevational view along the line 3—3 of Fig. 2.

Fig. 3A is a fragmentary sectional view illustrating the manner of securing the locking pins in position.

Fig. 4 is a view similar to Fig. 3 illustrating the manner of assembly of the connecting means for the piston pin bosses.

Fig. 4A is a partial top plan view of the piston as shown in Fig. 4.

Fig. 5 is a bottom plan view of the piston forging prior to the assembly of the piston pin.

Fig. 6 is a side elevational view of the connecting rod and piston pin assembly, a portion of the piston being broken away.

Fig. 7 is a top plan view of the connecting rod and piston pin assembly as shown in Fig. 6.

Referring to the drawing, reference character A represents the piston, B the piston pin bosses, and C the connecting rod and piston pin assembly.

The piston A comprises the cylindrical head portion 10 and cylindrical skirt portion 11 preferably forged together as a unit from duralumin or other suitable light weight alloy having the requisite strength. The head 10 is provided with transversely spaced cylindrical bores 12 and 13 extending therethrough, these bores each having an enlarged concentric opening or counterbore 14 forming an annular shoulder 15 spaced inwardly from the piston upper or outer face 16. The bores 12 and 13 have their axes parallel with the axis of the piston and lying in a plane containing the piston axis.

The cylindrical skirt 11 depends from the head 10 and is preferably imperforate, being free from boss openings, slots, perforations, and the like. Thus, the skirt maintains a good true fit with the cylinder without tendency to destroy the desired oil film. Heretofore it has been customary to provide openings or slots in the skirts of pistons but this results in relief of the oil film with accompanying piston slap and undue wear of the piston and cylinder rubbing surfaces. Furthermore the aforesaid conventional openings, slots, and the like produce local stresses and distortions in the piston when subjected to the operating temperatures, and this in turn results in a tendency to oil pumping which requires a relatively large number of sealing rings to check the escape of oil. Each added sealing ring materially lowers the power output of the engine by reason of the additional friction loss and wear occasioned by the ring expanding against the cylinder.

As shown in Fig. 5 the underface of the piston is preferably provided with a series of transversely extending inwardly projecting fins or ribs 17. Certain of the ribs 17 extend from points adjacent the bores 12 and 13 toward the skirt 11, the ribs serving to facilitate cooling of the piston and also to add rigidity to the piston structure. For additional strengthening of the structure and to avoid sharp weakening corners, the inner wall of skirt 11 may be chamfered at 18 to form the juncture between this inner wall and the underface of the piston.

The piston head 10 as herein illustrated has a plurality of annular grooves 19 preferably two in number for accommodating the piston rings 20. In my aforesaid co-pending applications the pistons described therein carry only a single piston ring and, if desired, a single ring may be used in my subject piston since certain generic features of my pistons render the use of a large number of rings unnecessary.

Fitting within each of the bores 12 and 13 is a forged duralumin piston pin boss B, each having an outwardly extending reduced threaded portion or post 21 adapted to threadedly receive the nut D as viewed in Fig. 4 prior to the final machining of the piston face. The threaded portions 21 preferably project substantially to the face of the piston as forged and when the bosses are seated in place as shown in Fig. 4. Each nut has an outwardly extending end 22 flattened at 22ª as best shown in Fig. 4A for engagement by a suitable wrench and a cylindrical portion 23 adapted to closely fit into the associated bore 12 or 13. The bosses B have shoulders 20ª shown in Fig. 6 engaging the underface of the piston head to limit outward movement of the bosses B as the nuts D are tightened.

The bosses B project inwardly of the piston head within skirt 11 to provide co-axial piston pin bearings or openings 24 adapted to receive the cylindrical end bearing portions 25 of the T-shaped piston pin 26 which will presently be referred to in further detail.

After the bosses B are assembled on the piston pin 26 they are positioned within the bores 12 and 13. The nuts D are then threaded on the portions 21 and these parts securely relatively drawn together with the bosses B seated at 20ª and the nuts reacting on the shoulders 15 as viewed in Fig. 4. The holes 27 are then drilled inwardly of the piston face opposite the flats 22ª at the contact between the bosses B and the enlarged openings 14 as shown in Fig. 3. Retaining or locking pins 28 preferably also of duralumin are then forced into the holes 27, the upper ends of the pins preferably lying slightly inwardly from the face of the piston. The edges of the holes 27 are then staked in at several points with a punch as indicated at 29 in Figs. 3A and 4 to lock the retaining pins in place. When the piston face is finally machined along the line X—X the punch depressions are removed, sufficient material being left overhanging the ends of pins 28 to hold them securely in place as shown in Fig. 3.

During the final machining operation along the line X—X the wrench ends of the nuts D and the outer ends of the threaded reduced portions 21 are also cut off flush with the piston face, the final assembly being shown in Figs. 1 to 3, inclusive, and Fig. 6. If desired, the wrench ends of nuts D may be removed prior to drilling the holes 27 in which instance the final machining of the piston face will remove the outer extremities of the threaded portions 21 simultaneously with the removal of the punch depressions. In this manner the bosses B are properly located and securely attached to the head 10 against any relative displacement, the nuts D being prevented from turning when the piston is in operation. If desired, the bosses B may be provided with openings 30 for admitting lubricant to the pin bearings 25 associated therewith. A piston constructed in the above manner presents a substantially smooth uninterrupted upper face portion free from objectionable pockets or recesses which, when present, will carbonize and decrease engine operating efficiency.

It will be apparent that the connecting rod including the T-shaped piston pin 26 will be securely held assembled with the piston and since the pin 26 and bosses B are machined and assembled before connection to the piston head, the desired accurate alignment of the parts is provided.

The connecting rod assembly C, by itself and apart from its novel cooperative relationship with the piston, forms the subject matter of my co-pending application Serial No. 730,434, filed June 13, 1934. This connecting rod structure is preferably of forged steel and comprises the lower bearing portion 31 and the upper piston pin portion 32. This assembly is constructed for a maximum of strength and a minimum of weight.

The piston pin portion 32 has a bore 33 extending through the pin 26 and the rod portion at right angles thereto also has a bore 34 axially thereof, these bores communicating by an oil hole 35. A reinforcing flange 36 extends from the rod portion and surrounds the upper central portion of the pin 26 for strengthening the T-joint formed by the pin and rod portions.

The lower end of the rod portion has a cylindrical bearing 37 adapted on assembly with the bearing portion 31 to closely fit in the upwardly opening socket 37ª, the joint thus formed being copper hydrogen welded to form a permanent structure.

Below the socket 37ª the bearing portion 31 has an enlarged portion of relatively thin cross section in the direction transversely of pin 26 to provide the opening 38. This opening receives a bushing 39 and the latter in turn receives the crank pin (not shown). A strengthening flange 40 extends outwardly preferably from opposite sides of the upper socket's end 37ª and around the opening 38. Extending at right angles to the flange 40 the opening 38 is bounded on each side of the bearing portion 30 with an annular web or flange 41 and the spaced flanges or ribs 42, 43 extend between the lower end of the socket 37ª to the flange 41.

What I claim is:

1. In a piston having head and skirt portions, a piston pin receiving boss having a portion thereof extending through said head portion, a cylindrical securing member threaded on said extended boss portion, the outer face of said head portion having a cylindrical recess closely receiving said securing member, and a locking pin engaging the contacting cylindrical surfaces of said extended portion and said recess, a portion of the wall of said recess overhanging the adjacent end of said pin, said securing member and said pin presenting in conjunction with said head portion a substantially uninterrupted flat face therefor.

2. The method of securing a piston pin boss to a piston consisting in clamping the boss in position by a clamping element having a tool engageable portion adapted to be sheared off upon the application of force when said boss is clamped in position, inserting a pin in the piston and in locking engagement with the clamping element, deforming a portion of the piston inwardly thereof adjacent the pin to secure the pin in place, and machining an outer surface of the piston to substantially remove the irregularities incident to said deformation and shearing of said clamping element for providing a substantially smooth uninterrupted piston face.

ROGER K. LEE.